United States Patent
Pierce, Jr.

[11] Patent Number: 6,138,407
[45] Date of Patent: Oct. 31, 2000

[54] CROSS ARM AND TRELLIS APPARATUS AND METHOD

[75] Inventor: Leon W. Pierce, Jr., Stockton, Calif.

[73] Assignee: Leon W. Pierce, Stockton, Calif.

[21] Appl. No.: 09/137,626

[22] Filed: Aug. 21, 1998

Related U.S. Application Data

[60] Provisional application No. 60/064,202, Nov. 4, 1997.

[51] Int. Cl.[7] .................................................. A01G 17/04
[52] U.S. Cl. .................................................. 47/46
[58] Field of Search .................. 52/736; 47/46, 47/47

[56] References Cited

U.S. PATENT DOCUMENTS

| | | |
|---|---|---|
| D. 196,840 | 11/1963 | Case . |
| D. 280,794 | 10/1985 | Evans ...................................... 47/46 X |
| D. 343,693 | 1/1994 | Jeffrey . |
| D. 398,064 | 9/1998 | Pierce, Jr. . |
| 2,906,380 | 9/1959 | Sanders . |
| 3,807,089 | 4/1974 | Senese ........................................ 47/46 |
| 4,329,811 | 5/1982 | Coulson ...................................... 47/46 |
| 4,965,961 | 10/1990 | Broyles . |
| 5,966,867 | 10/1999 | Downer et al. ............................. 47/46 |

*Primary Examiner*—Richard Chilcot
*Attorney, Agent, or Firm*—Sierra Patent Group, Ltd.

[57] ABSTRACT

A cross arm apparatus for providing structural support in agricultural and other applications. The cross arm comprises a folded section adjacent one edge, a bent, angled or beveled section adjacent a another edge, and a generally planar section or region extending between the folded section and angled section. Slotted catch holes in the ends of the cross arm provide for releasibly attaching wires to the cross arm. Notches and holes in the cross arm allow the cross arm to be attached to other structural elements such a vertical supports or additional cross arms. The cross arm can be assembled with a vertical support and additional cross arms to provide a variety of trellis structures.

17 Claims, 4 Drawing Sheets

CROSS ARM AND TRELLIS APPARATUS AND METHOD

This application is entitled to the benefit of Provisional Patent Application Ser. No. 60/064,202, filed on Nov. 4, 1997.

BACKGROUND OF THE INVENTION

1. Field of the Invention

The present invention pertains generally to support structures and devices, and more particularly to an agricultural cross arm and trellis apparatus for use in supporting plants, vines or trees which is compatible with mechanical harvesting techniques.

2. Description of the Background Art

Trellis devices have long been used in vineyards and other agricultural operations to support growing vines and plants. Such trellises typically comprise a vertical support with one or more cross arm members affixed to the vertical support. A wire network frequently extends between the cross arms of a series of adjacent trellis structures to provide additional support for plants. Typically, a series of long wires are attached to the cross arm of each trellis within a row of trellises. Wooden trellis structures have long been used in agriculture, but tend to weather and decompose and thus require replacement. In order to overcome this problem, a variety of metal trellises and cross arms have been developed. Metal trellises as used in agriculture have typically employed a conventional metal "T-stake or "roll form" stake as a vertical support member, with a metal cross-arm fastened to the vertical stake. Notches, grooves or slots are usually included adjacent the center of the metal cross arms to facilitate attachment to a vertical T-stake support, and slots of various configuration are included along the cross arms and adjacent the ends of the cross arms to facilitate attachment to wires which run or extend between cross arms along the row of trellises.

The currently known metal cross arm and trellis devices have proved deficient in various respects. Perhaps the greatest drawback of presently available metal trellis structures is inability to withstand the mechanical forces exerted by mechanical harvesting equipment. While grapes and other fruit have traditionally been hand-picked, the use of automated harvesting equipment for such crops is becoming increasingly widespread. The central slots and notches, which are cut into the metal cross arms to facilitate attachment to the vertical T-stake, create a weak point in the cross arm which allows the cross arm to bend or break under the action of mechanical harvesting equipment. The bent or broken cross arms require replacement, and the bending or breaking of the cross arms frequently results in damage to the vine supported thereon.

Another drawback to conventional trellis cross arms is that the action of mechanical harvesters often causes the wires extending between trellises to disengage from the slots provided on the cross arms. The removal of the wires from the cross arms can result in damage to vines supported by the wires, and requires time consuming and labor intensive replacement of the wires. One approach to remedying this problem has been to include bendable metal tabs adjacent the slots for the wires, so that once a wire is inserted in the slot, the tab can be bent into a position to more securely hold the wire within the slot. However, metal cross arms with bent metal tabs cannot be directly manufactured by conventional roll forming techniques, and the bending of the tabs must be carried out subsequent to roll forming via expensive hand labor. Further, the use of such bendable tabs has generally not been effective because employees in the field tend to insert wires into slots on cross arms without bothering to bend the tabs, in order to save time and effort, or do not correctly bend the tabs to retain the wire within the slot.

Accordingly, there is a need for a cross arm apparatus and method for use in trellis structures which is easy to manufacture and is mechanically robust, which can be used for agricultural support structures, which does not undergo bending or breaking under the forces exerted by mechanical harvesting equipment, and which retains attached wires under the forces exerted by mechanical harvesting equipment. The present invention satisfies these needs, as well as others, and generally overcomes the deficiencies found in the background art.

SUMMARY OF THE INVENTION

The present invention is a cross arm apparatus for providing structural support for agricultural and other applications, which is suitable for use with mechanical harvesting equipment, which is easy and inexpensive to manufacture, and which is easy to install and use. In general terms, the invention comprises a cross arm having a folded section or region adjacent one edge, a bent, angled or beveled section or region along a another edge, and a generally planar section or region extending between the folded section and angled section. Preferably, the invention also includes means for releasibly holding one or more wires on the cross arm, and means for coupling a cross arm to additional cross arms or other support elements.

By way of example and not of limitation, the cross arm of the invention is of generally elongated rectangular shape and includes first and second ends, with first and second edges extending longitudinally between the first and second ends. The folded section or region preferably has a "U"-shaped cross section, and extends longitudinally between the first and second ends of the cross arm adjacent the first edge. The beveled section extends longitudinally between the first and second ends of the cross arm adjacent the second edge. The planar section between the folded section and beveled section also extends longitudinally between the ends of the cross arm. The planar section and adjacent folded section are oriented at generally a right angle to each other, and impart a generally "J"-shaped cross sectional shape to the cross arm. The U-shaped folded section or fold generally includes an inner part or leg adjacent to the planar section of the cross arm, an outer part or leg which is adjacent to the first edge of the cross arm, and a curved region connecting the inner and outer parts of the folded section. The inner and outer parts of the U-shaped folded section are generally parallel to each other, and generally perpendicular to the planar section of the cross arm. The outer part of the folded section is preferably larger than the inner part thereof.

Preferably, means for attaching the cross arm to a support element such as a vertical post are provides as one or more pairs of laterally spaced notches on opposite edges of the cross arm so that the folded section is located between the notches. Preferably, one such pair of notches is included adjacent the center of the cross arm. The notches are preferably adjacent the center of the cross aim, and are structured and configured to receive the edge of a vertical support member. A plurality of holes, both round and oblong, extend through the planar section adjacent the center of the cross arm to facilitate attachment of the cross arm to a vertical support or other cross arms via a conventional "U"-bolt or clevis.

The means for releasably holding a wire on the cross arm preferably comprises a slotted catch hole or keyhole shaped opening, with one such slotted catch hole preferably included adjacent each of the first and second ends of the cross arm. The catch hole is generally of round shape and has a diameter which is greater than the width of the slot connected to the hole. The slot extends inward from the end of the cross arm to the catch hole and communicates with the catch hole and the end of the cross arm. The slot is positioned on the inner part of the folded section, while the catch hole is positioned partially on the inner part of the folded section and partially on the planar section of the cross arm, so that the portion of the catch hole on the planar section is generally at a right angle to the remainder of the catch hole and associated slot. The slotted catch hole is thus structured, configured and positioned so that a biaxial twisting motion is required to insert or remove a wire from the catch hole.

The wire holding means of the invention may alternatively or additionally comprises one or more straight slots or "T"-shaped slots along the second edge of the cross arm, and/or one or more holes extending through the planar section of the cross arm, with the slots and holes being structured and configured to receive and hold wires via conventional wire fastening techniques.

One or more of the cross arms of the present invention may be used in conjunction with one or more vertical supports to provide an agricultural trellis apparatus. In a first embodiment trellis apparatus, a single, first cross arm is joined to a single vertical support at generally a right angle to provide a cross-shaped trellis apparatus. In a second embodiment, second and third cross arms are fastened to the vertical support and first cross arm such that the second and third cross arms define a "V" shape. In a third embodiment, a fourth cross arm is joined to the vertical support below the first cross arm and generally parallel to the first cross arm, and the second and third cross arms are joined to both the first and second cross arms to define a "Geneva Double Curtain" or "GDC" trellis structure. Various additional trellis, lattice, ladder, scaffold and other support structures may also be assembled with the invention.

In using the present invention for an agricultural trellis, a cross arm is fastened to a vertical support such as a T-stake which is mounted in the ground. The laterally spaced slots on the edges of the cross arm adjacent the center are positioned so that an edge of the T-stake is received by the slots. The threaded ends of a U-bolt are inserted through the appropriate oblong or round holes located in the planar section of the cross arm adjacent the center thereof, and nuts are used to tighten the U-bolt about the vertical support and thus secure the cross arm to the vertical support. As noted above, a plurality of holes are preferably provided adjacent the center of the cross arm, and the holes selected for the U-bolt will vary for different size T-stakes and U-bolts. Additional cross arms may also be attached to the vertical support and cross arm, as described above, to provide different trellis structures. In use, the notches and holes at the center of the cross arm, which accommodate the T-stake vertical support, do not create a weak spot at which failure can occur because of the support provided by the U-shaped folded section on the cross arm, which is located between the notches and which extends generally along the length of the cross arm to provide mechanical strength. Thus, when the cross arm of the invention is subject to forces, such as those exerted by mechanical harvesting equipment during harvesting of fruit from vines or plants supported by the cross arm, the cross arm will not undergo bending or failure as occurs in previously available cross arm and trellis devices.

Generally, a plurality of trellis structures and associated cross arms are utilized at the same time, and are arranged in rows in a field. Long wires extending along the rows of trellises and attached to the cross arms of each trellis in a row. Vines or other plants are trained onto the cross arms and wires for support thereon. The wires, when attached to the ends of the cross arms, extend generally at an orientation which is perpendicular to the plane defined by the cross arm and vertical support. The wires are attached to the cross arms of each trellis apparatus by inserting the wires edge-wise into the slotted catch holes included at the ends of the cross arm. As noted above, a biaxial twisting operation is required to insert the wire into the slotted catch hole. The wire, when oriented perpendicular to the plane defined by the planar section of the cross arm, cannot be inserted directly into the slotted hole because the slot is located in the inner part of the folded section and is inaccessible to the wire. Further, the wire cannot be inserted into the slot when the wire is positioned in an orientation which is coplanar with the planar section of the cross arm because the outer part of the folded section will block the wire from entering the slot communicating with the catch hole. Thus, the wire must be twisted, angled or otherwise maneuvered with respect to a first axis which is generally perpendicular the plane defined by the planar section of the cross arm, and with respect to a second axis which is generally perpendicular to the first axis, in order to fit through the slot and be engaged or retained within catch hole. Once the wire has been inserted through the slot and reaches the catch hole, the wire can then be oriented or positioned perpendicular to the planar section of the cross arm. The manipulation required for insertion of the wire into the slotted catch holes on the cross arm is very difficult to duplicated by the action of mechanical harvesting equipment, and thus the wires are not stripped off of the cross arm when mechanical harvesting equipment is used to harvest fruit from vines or plants supported by the cross arm and attached wires. Further, the wire is securely retained on the cross arm without requiring the time consuming bending of tabs or use of ties to hold wires in place.

The cross arm apparatus of the invention is easy and inexpensive to manufacture because hand labor associated with forming bendable parts is not required. Preferably, the cross arms are prepared from steel strip which is removed from a roll and die-punched at regular intervals with "dumbell"-shaped holes. The strip is subsequently cut through the dumbell shaped holes to provide a plurality of strip segments which each have slotted catch hole at one end. The strip segments are then roll-formed by conventional means to provide the cross arm of the invention by providing the folded or U-shaped section adjacent one edge, the bent or beveled section adjacent the other edge, and the planar section in between, with the slotted catch holes positioned generally at the junction of the U-shaped section and planar section as described above. The central, laterally spaced notches for accommodating the T-stake, as well as other holes and slots used for fastening to the T-stake or attachment of wires, are preferably die-punched into the steel strip prior to cutting and roll forming as described above.

An object of the invention is to provide a cross arm apparatus which is robust and resistant to bending or breaking.

Another object of the invention is to provide a cross arm apparatus which can resist the forces exerted by mechanical harvesting equipment.

Another object of the invention is to provide a cross arm apparatus to which wires can be quickly and easily secured without requiring bending of tabs or other bendable parts.

Another object of the invention is to provide a cross arm apparatus wherein attached wires do not undergo unwanted disengagement or removal from a cross arm due to the forces exerted by mechanical harvesting equipment.

Another object of the invention is to provide a cross arm apparatus which is easy and inexpensive to manufacture.

Another object of the invention is to provide a cross arm apparatus which is quick and easy to assemble into a variety of trellis and support structures.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figures 15, 16, 17, 18, 19:
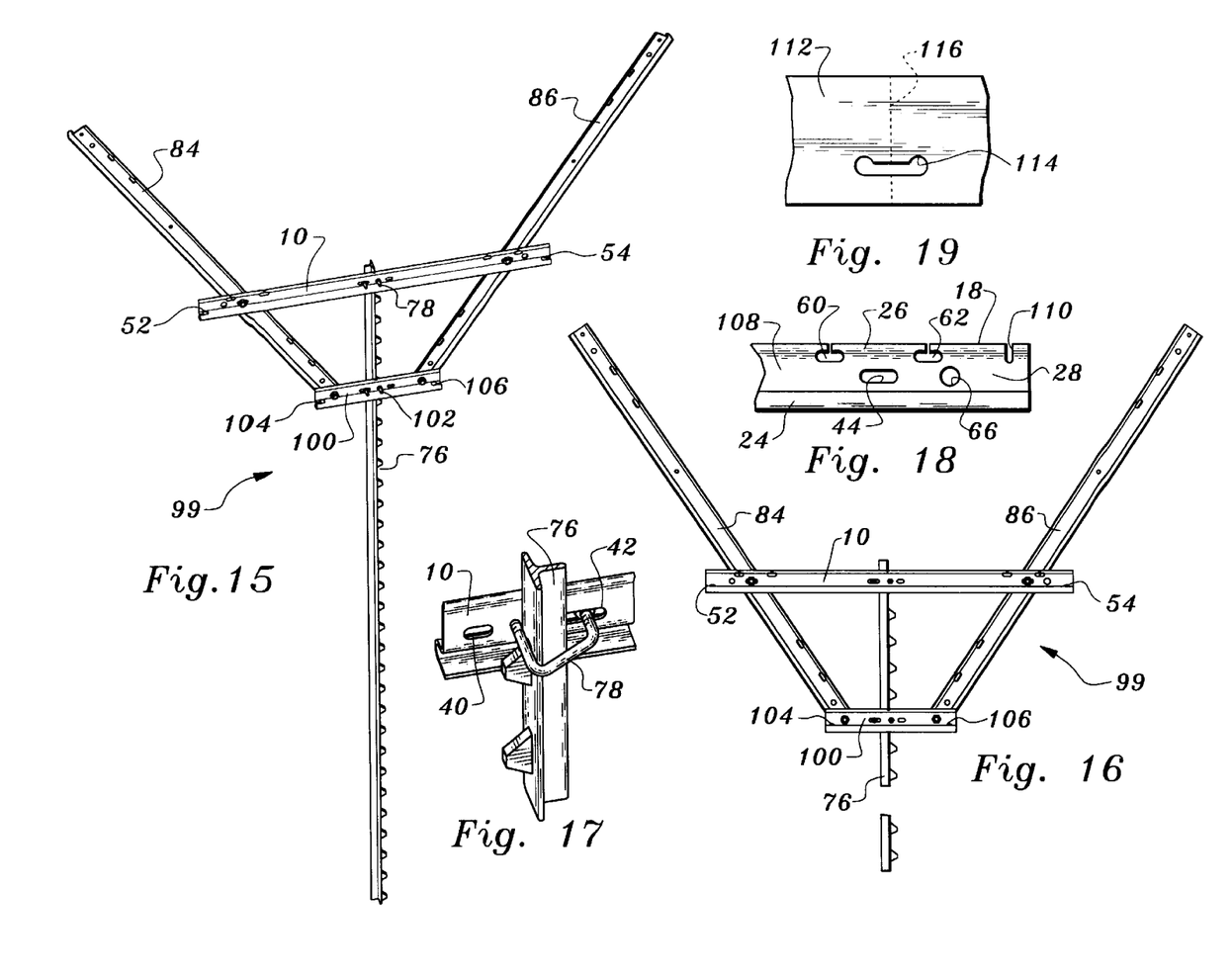
FIG. 15 is a perspective view of a third embodiment trellis apparatus using the cross arm apparatus of the invention.
FIG. 16 is a front elevation view of the trellis apparatus of FIG. 15 shown with a portion of the vertical support omitted.
FIG. 17 is a perspective view of a portion of the cross arm apparatus of FIG. 1 shown coupled to a vertical support by a U-bolt.
FIG. 18 is a front elevation view of a portion of an alternative embodiment cross arm apparatus in accordance with the invention.
FIG. 19 is a top plan view of a portion of steel strip with a "dumbell" shaped hole as used in the method of making the cross arm apparatus of the invention.

Referring more specifically to the drawings, for illustrative purposes the present invention is embodied in the apparatus shown FIG. 1 through FIG. 18, and the method steps illustrated generally in FIG. 19. It will be appreciated that the apparatus may vary as to configuration and as to details of the parts, and that the method may vary as to details and the order of the steps, without departing from the basic concepts as disclosed herein. The cross arm of the invention is disclosed generally in terms of agricultural use for vineyard trellis structures. The cross arm of the invention may be used in a variety of structural applications, however, such as a reinforcing strut or construction element.

Referring first to FIG. 1 through FIG. 4, a cross arm apparatus 10 in accordance with the invention is generally shown. Cross arm 10 is preferably of elongated, generally rectangular shape, and includes first and second ends 12, 14, first and second edges 16, 18 which extend longitudinally between first and second ends 12, 14, and first and second sides or faces 20, 22. Cross arm 10 includes a fold or folded section 24 adjacent first edge 16 which extends longitudinally between first and second ends 12, 14. A bent, beveled or angled section 26 extends longitudinally between first and second ends 12, 14 adjacent the second edge 18 of cross arm 10. A generally planar section 28 is located between folded section 24 and angled section 26, and extends longitudinally between first and second ends 12, 14.

Figures 1, 2, 3, 4:
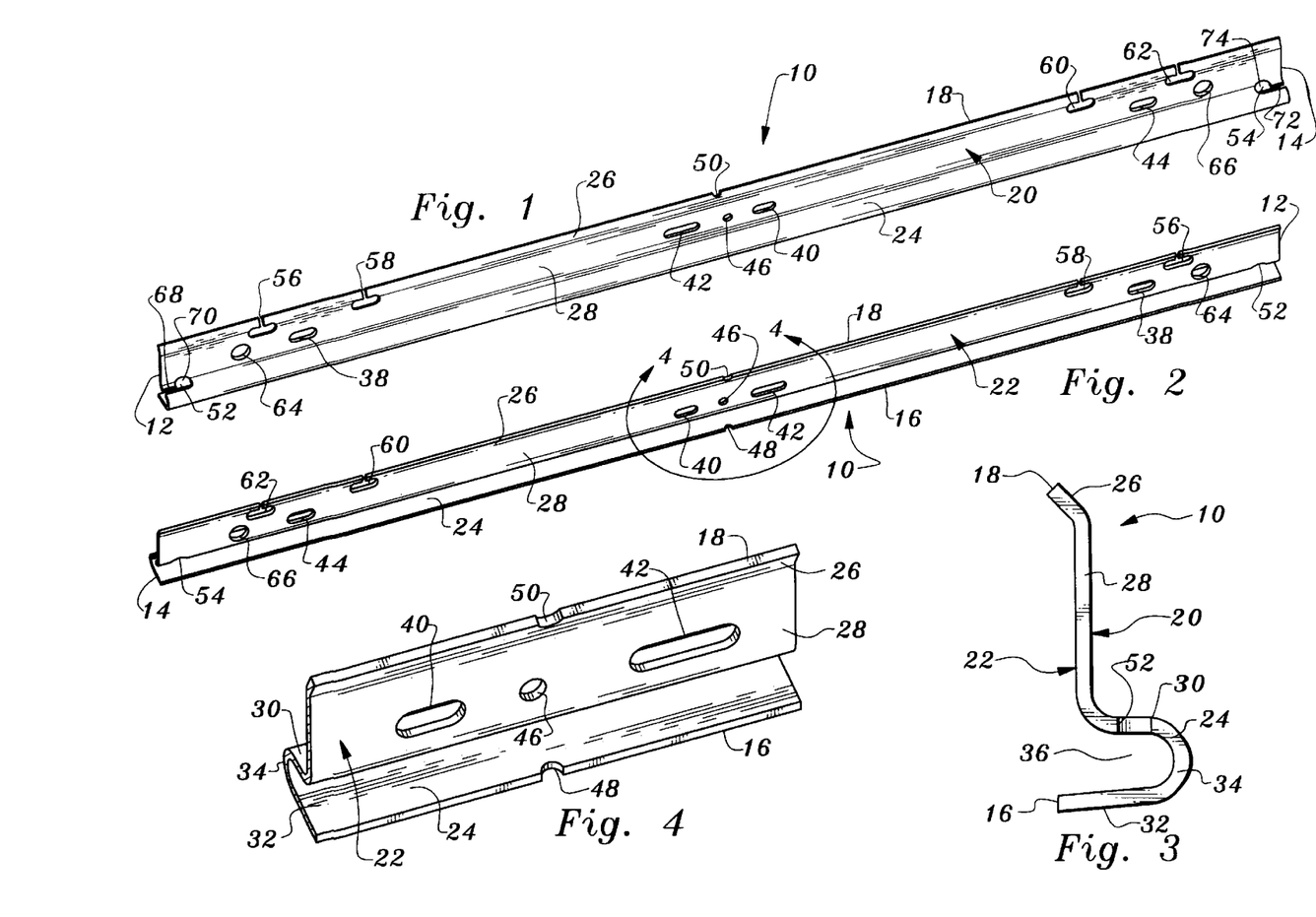
FIG. 1 is a perspective view of a cross arm in apparatus accordance with the present invention shown from a first side.
FIG. 2 is a perspective view of the cross arm apparatus of FIG. 1 shown from a second side.
FIG. 3 is a side elevation view of the cross arm apparatus of FIG. 1.
FIG. 4 is a detailed perspective view of a portion of the cross arm apparatus of FIG. 2 shown by line 4—4.

Folded section 24 is preferably "U"-shaped in cross section, and is oriented substantially perpendicularly to planar section 28. Referring more particularly to FIG. 3 and FIG. 4, folded section 24 includes an inner shelf-like part 30 which is joined to and generally contiguous with planar section 28, an outer flange or lip-like part 32 located adjacent first edge 16, and a curved region 34 joining inner part 30 and outer part 32. Preferably, inner part 30 is substantially parallel to outer part 32, and inner and outer parts 30, 32 are substantially perpendicular to planar section 28. Inner and outer parts 30, 32 define a channel 36 which faces or opens outward towards second side 22 and which extends between first and second ends 12, 14 of cross arm 10. Outer part 32 preferably is slightly larger than inner part 30 so that first edge 16 extends outward generally past the plane defined by planar section 28, and so that first and second edges 16, 18 lie generally within a plane (not shown) adjacent second side 22 which is substantially parallel to and spaced apart from the plane defined by planar section 28 of cross arm 10. Inner and outer parts 30, 32 of folded section 24 may alternatively be structured and configured such that inner and outer parts 30, 32 are not substantially parallel to each other or substantially perpendicular to planar section 28, but instead are angled or off-parallel relative to each other, or are angled off-normal relative to planar section 28.

Referring again to FIG. 1 and FIG. 2, as well as FIG. 3 and FIG. 4, means for coupling cross arm 10 to one or more support elements or members are included with the invention, and preferably comprise a plurality of oblong or "obround" openings or holes 38, 40, 42 44, and at least one round opening or hole 46, which allow cross arm 10 to be coupled to other structural or support elements, such as additional cross arms 10, by means of conventional fastening hardware such as nuts and bolts. Openings 40, 42, 46 are generally located adjacent the center of cross arm 10, and are shown as structured and configured for coupling cross arm 10 to a variety of conventional vertical support members such as posts, stakes, poles or the like. The oblong or obround shape of holes 38–44 allow positional adjustment of cross arm 10 relative to an attached support element, as described further below.

The means for coupling cross arm 10 to a support element also preferably comprises first and second notches 48, 50, located in first and second edges 16, 18 respectively of cross arm. Notch 48 in first edge 16 extends into the outer part 32 of folded section 24. Notch 50 in second edge 18 extends into angled section 26. Notches 48, 50 are centrally located and laterally spaced apart, and are structured and configured for coupling to a conventional vertical support member, as discussed further below. Folded region 24 is located between notches 48, 50 and provides reinforcement to cross arm 10 so that notches 48, 50 do not create a weak spot or failure point at which cross arm 10 could bend when subject to stress. The arrangement of openings 40, 42, 46 and notches 48, 50 as shown is particularly suitable for coupling to a conventional "T"-stake of the type commonly used for fencing. Notches 48, 50 are located generally at the center of cross arm 10, with hole 46 being slightly off-center with respect to a centerline (not shown) defined by notches 48, 50, and with oblong holes 40, 42 being further off center from the center line. The arrangement of openings 40, 42, 46 and notches 48, 50 may be varied as required to accommodate different types of vertical supports or mounting elements for cross arm 10.

The cross arm apparatus 10 of the invention preferably includes means for releasibly attaching one or more wires thereto, preferably in the form of first and second slotted catch holes or "key holes" 52, 54 located adjacent first and second ends 12, 14 respectively. The releasible wire attaching means of the invention may additionally or alternatively comprise a plurality of conventional "T"-slots 56, 58, 60, 62 located adjacent second edge 18 of cross arm 10. For reasons of clarity, only four T-slots are shown in cross arm 10, although a plurality of additional T-slots may be included along second edge 18 of cross arm 10. Slotted catch holes 52, 54 and T-slots 56–62 are each structured and configured to receive and retain a wire via a biaxial twisting motion, as described further below. The wire attaching means also preferably comprises one or more openings 64, 66 in planar section 28 of cross arm, which accommodate a tie-wire (not shown) for tying down a wire held within T-slots 56, 62.

Figures 5, 6, 7, 8, 9:
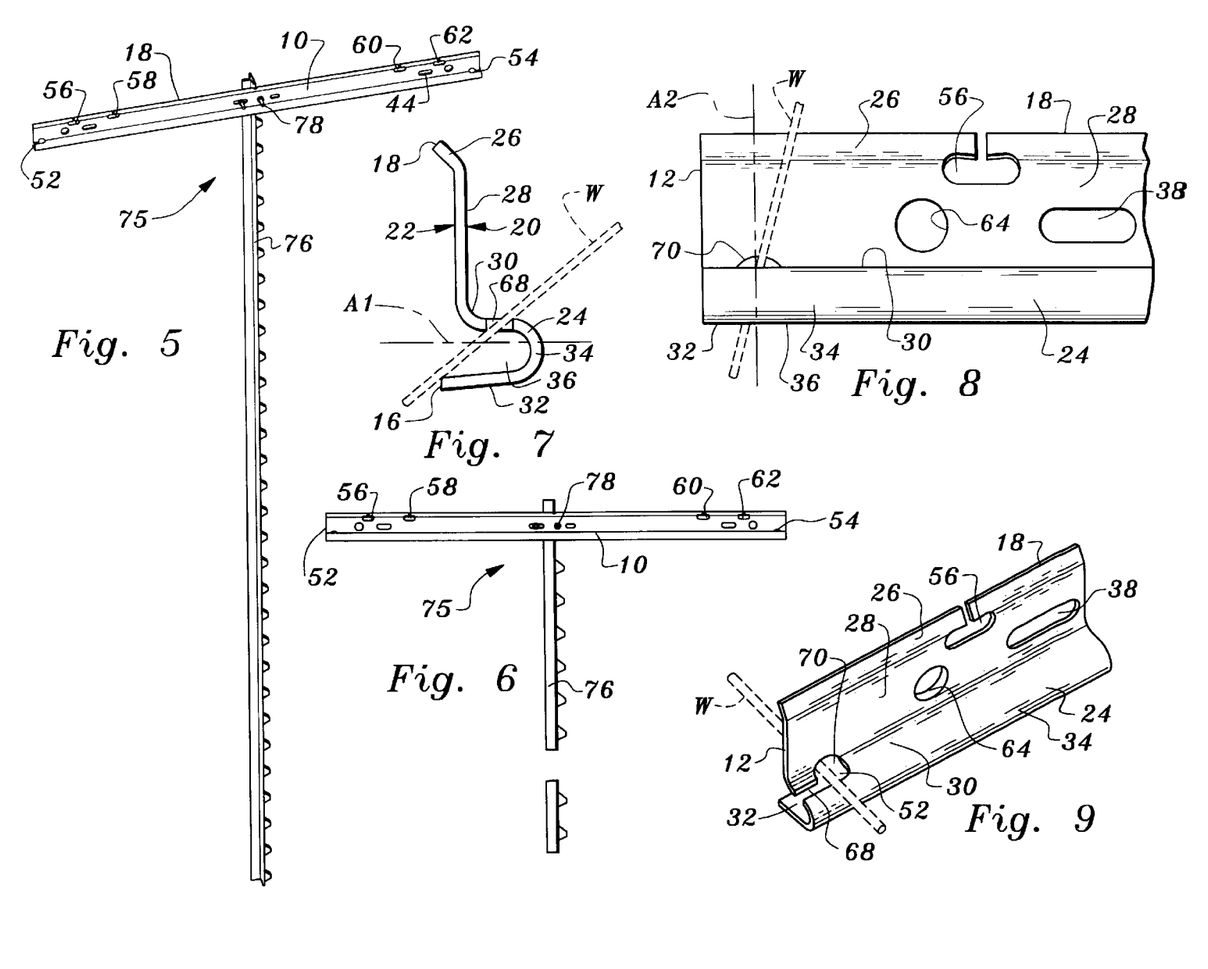
FIG. 5 is a perspective view of a first embodiment trellis apparatus using cross arm apparatus of the invention.
FIG. 6 is a front elevation view of the trellis apparatus of FIG. 5 shown with a portion of the vertical support omitted.
FIG. 7 is a side elevation view of the cross arm apparatus of FIG. 1 showing a wire inserted D in a slotted catch hole while twisted relative to a first axis.
FIG. 8 is a front elevation view of a portion of the cross arm apparatus of FIG. 1 showing a wire inserted into a slotted catch hole and twisted relative to a second axis.
FIG. 9 is a perspective view of a portion of the cross arm apparatus of FIG. 1 showing a wire retained in a slotted catch hole.

Referring more particularly to FIG. 7 through FIG. 9, as well as FIG. 1, first slotted catch hole 52 includes a first slot 68 and a generally round first catch hole 70. First slot 68 is located in the upper part or shelf 30 of folded section 24, and first slot 68 communicates with first end 12 and first catch hole 70 so that a wire may be inserted through first slot 68 and into first catch hole 70 from first end 12 of cross arm 10. First catch hole 70 is positioned partially on planar section 28 and partially on the upper part or shelf 30 of folded section 24, as seen most clearly in FIG. 9, so that the portion of first catch hole 70 on planar section 28 is at substantially a right angle to the portion of first catch hole 70 on upper part 30 of folded section 24. Second slotted catch hole 54 likewise includes a second slot 72 and a generally round second catch hole 74, as shown in FIG. 1, with second catch hole 74 positioned partially on planar section 28 and partially on upper part 30 of folded section 24, so that a portion of second catch hole 74 on planar section 28 is at substantially a right angle to the portion of second catch hole 74 on upper part 30 of folded section 24.

The structure and configuration of first and second slotted catch holes 52, 54 as described above requires a biaxial twisting operation for edge-wise insertion and removal of wires from slotted catch holes 52, 54. A wire W, when oriented perpendicular to the longitudinal axis of cross arm 10 and generally normal to planar section 28 as shown in FIG. 9, cannot be inserted directly into first catch hole 70 because the connecting first slot 68 is located in the inner part 30 of folded section 24 and is inaccessible to the wire W. Further, if wire W is angled away from the aforementioned perpendicular orientation to cross arm 10, wire W still cannot be inserted into catch hole 52 because the outer part 32 of folded section 24 will block wire W from entering slot 68. Thus, in order to be inserted into first slot 68 and first catch hole 70, wire W must be twisted, angled or otherwise maneuvered with respect to a first axis A1, shown in FIG. 7, which is generally normal or perpendicular to first and second sides 20, 22 and planar section 28 of cross arm 10, and must also be twisted with respect to a second axis A2, shown in FIG. 8, which is generally perpendicular to first axis A1 and coplanar with planar section 28. The orientation of wire W relative to axis Al as shown in FIG. 7 allows the edge of wire W to be positioned adjacent slot 68, while the orientation of wire W with respect to A2 as shown in FIG. 8 allows wire W to clear lower part 32 of folded region so that wire W can slide through slot 68 and into catch hole 70. Once wire W has been thus oriented with respect to axes A1 and A2, wire W will slip through slot 68 and into catch hole 70. Once wire W enters catch hole 70, wire W is rotated so that it is perpendicular to cross arm 10 as shown in FIG. 9. The same procedure is used for insertion and removal of wires from slotted catch hole 54.

Cross arm 10 can alternatively be structured and configured such that outer part 32 of folded section 24 is omitted, or such that outer part and curved region 34 of folded section are omitted. In these cases, a substantially "L"-shaped cross sectional shape is imparted to cross arm due to the absence of outer part 32. In this embodiment of the invention, slotted holes 52, 54 are positioned on inner part 30 and planar section 28 in the manner described above. The use of cross arm 10 without outer part 32 is generally less preferred, however, because the absence of outer part 32 both reduces the mechanical strength of cross arm 10 and makes it easier for wire W to disengage from catch holes 52, 54.

Figures 10, 11, 12, 13, 14:
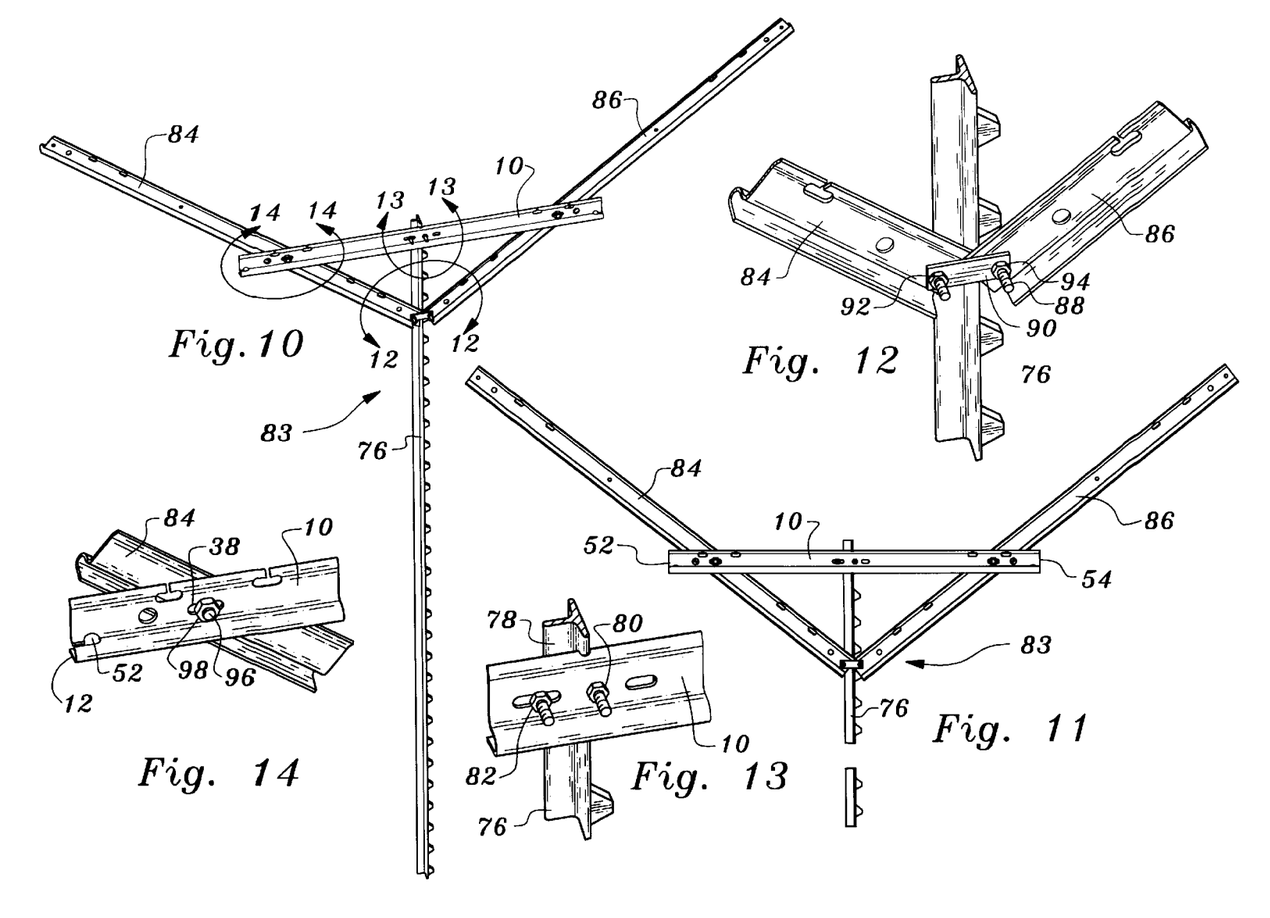
FIG. 10 is a perspective view of a second embodiment trellis apparatus using the cross arm apparatus of the invention.
FIG. 11 is a front elevation view of the trellis apparatus of FIG. 10 shown with a portion of the vertical support omitted.
FIG. 12 is a detail of a portion of the trellis apparatus of FIG. 10 shown by line 12—12.
FIG. 13 is a detail of a portion of the trellis apparatus of FIG. 10 shown by line 13—13.
FIG. 14 is a detail of a portion of the trellis apparatus of FIG. 10 shown by line 14—14.

Referring now to FIG. 5 and FIG. 6, a first embodiment trellis or support apparatus 75 is shown which utilizes the cross arm apparatus 10 of the invention. Trellis apparatus 75 includes a cross arm 10 and vertical support element or member 76, with cross arm 10 coupled to vertical support element 76 by a "U"-bolt 78. Referring also to FIG. 13 and FIG. 17, vertical support element 76 is a conventional "T"-stake of the type commonly used for fencing. Referring also to FIG. 1 through FIG. 9 again as well as FIG. 13 and FIG. 17, U-bolt 78 is structured and configured to fit about T-stake 76 and through the oblong hole 42 and round hole 46 adjacent the center of cross arm 10. Nuts 80, 82 are used on the ends of U-bolt 78 to hold U-bolt 78 and cross arm 10 onto T-stake 76. Round hole 46 is positioned generally at the center of cross arm 10, and oblong holes 40, 42 positioned on either side of round hole 46 and are structured and configured to allow attachment of cross arm 10 to a variety of conventional vertical support elements, including T-stakes, roll form stakes, posts, pipes and like vertical support members of different sizes and configurations. The oblong shape of holes 40, 42 can accommodate different sized U-bolts as required for different types of vertical support elements, and provide "play" and allow positional adjustment of U-bolt 78 within holes 40, 42 prior to tightening down nuts 80, 82, so that cross arm 10 can be angled and positioned relative to T-stake 76 as desired. Thus, to make trellis apparatus 75, cross arm 10 is positioned adjacent T-stake 76 with the center of cross arm 10 generally adjacent T-stake 76, and with cross arm 10 generally perpendicular to T-stake 76. The ends of U-bolt 78 are then fitted through oblong hole 42 and round hole 46, and nuts 80, 82 are threaded onto the ends of U-bolt 80 and tightened thereon while cross arm 10 is suitably oriented.

In using the present invention for agricultural applications such as vineyards, a plurality of trellis apparatus 75 are preferably utilized at the same time, and are arranged in rows in a field, with each cross arm 10 in a row of trellises 75 being generally parallel to the cross arm 10 of each other trellis 75. Long wires run or extend along each row of trellises 75 at an orientation which is generally perpendicular to the cross arms 10, with the wires attached to each cross arm 10 by inserting the wires into the slotted catch holes 52, 54 included at the ends of each cross arm 10 in the manner described above, and/or by inserting wires edge-wise into the T-slots 56–62 on each cross arm. Vines or other plants are then trained onto the cross arms 10 and wires for support.

Angled or beveled section 26 prevents upward facing second edge 18 from pointing directly upward in a manner which can provide a cutting edge which would damage vines entrained on cross arm 10, and angled section 26 thus provides means for preventing damage to vines resting on cross arm. Cross arm 10 could alternatively be positioned on T-stake 76 such that folded section 24 and first edge 16 are on top rather than second edge 18 as shown in FIG. 5. As shown, angled section 26 is angled or tilted at approximately forty five to fifty degrees from the plane defined by planar section 28. However, the orientation of angled section 26 relative to planar section 28 may be varied as desired for different applications of the invention, and thus the particular orientation of angled section 26 relative to planar section 28 should not be considered limiting. Angled section 26, for example, may be bent or angled ninety degrees relative to planar section 28, or at an angle greater than ninety degrees such that angled section 26 defines a fold relative to planar section 28. Angled section 26 may alternatively be oriented at an angle which is less than forty five degrees. For example, in applications of the invention wherein multiple cross arms 10 are joined together, angled section 26 can be tilted or oriented at a relatively shallower angle, such as twenty five degrees, to provide a flatter profile to side 22 of cross arm 10 and facilitate the coupling of adjacent cross arms 10 to each other. Such an arrangement is advantageous when the cross arms of the invention are joined together "back-to-back" such as in trellis structures shown in FIG. 10 and FIG. 15, discussed below.

As related above, previously known cross arms device when used on agricultural trellises have proved deficient in that, when subject to the forces exerted by mechanical harvesting equipment, the cross arm can undergo bending or breaking, particularly at the center of the cross arm wherein notches, slots or holes are included to facilitate attachment to a vertical support. In the present invention however, the longitudinally extending folded section 24 provides mechanical support to prevent bending or breaking of cross arm 10. Notches 48, 50, which accommodate T-stake 76, do not create a weak spot at which failure can occur because of the support provided by folded section 24 which is located between notches 48, 50 and which extends generally along the length of cross arm 10. Additionally since outer part 32 of folded section 24 is in a substantially perpendicularly orientation to T-stake 76, and angled section 26 is substantially angled relative to T-stake 76, T-stake 76 can firmly engage notches 48, 50 so that cross arm 10 will not undergo undesired rocking motion while mounted on T-stake 76. Angled section 26 provides further reinforcement to cross arm 10 as well as providing means for preventing damage to vines as described above. Thus, when cross arm 10 is subject to the forces exerted by mechanical harvesting equipment during harvesting of fruit from vines or plants supported by cross arm 10, cross arm 10 will not undergo bending or failure as occurs in previously available cross arm devices, and will not undergo unwanted motion relative to T-stake 76. The mechanical strength of cross arm 10 allow the invention to be used to provide support to vines, plants, trees and the like in a variety of agricultural applications wherein mechanical harvesting is employed.

Wire W, as shown in FIG. 9, cannot be removed from slotted catch hole 52 (or slotted catch hole 54) unless the biaxial twisting motion described above is repeated. The aforementioned manipulation required for insertion and removal of wire W from slotted catch holes 52, 54 is very difficult to duplicated by the action of mechanical harvesting equipment, and thus wires W are not stripped off of the ends 12, 14 cross arm 10 when mechanical harvesting equipment is used to harvest fruit from vines or plants supported by cross arm 10 and attached wire W. Further, wire W is securely retained on cross arm 10 without requiring the time consuming bending of tabs or use of ties to hold wires in place as is required by previously used cross arm devices.

Referring now to FIG. 10 through FIG. 14, a second embodiment trellis apparatus 83 in accordance with the invention is generally shown, wherein like reference numerals denote like parts. Trellis apparatus 83 includes a cross arm 10 perpendicularly attached to T-stake 76 via U-bolt 78, as in trellis apparatus 75 above. Trellis apparatus 83 further comprises second and third cross arms 84, 86 which are joined to first cross arm 10 and T-stake 76 to define a generally "V"-shaped structure. Referring particularly to FIG. 12, holes (not shown) in second and third cross arms 84, 86 accommodate the ends of a U-bolt 88 which fits about T-stake 76 and is fastened with a plate-like washer 90 and nuts 92, 94. Referring particularly to FIG. 14, second cross arm 84 is fastened to first cross arm 10 via bolt 96 which extends through oblong hole 38 in first cross arm 10 and a corresponding oblong hole (not shown) in second cross arm 84, and fastened therein with nut 98. Third cross arm 86 is fastened to cross arm 10 adjacent the opposite end thereof in a like manner. A plurality of trellis apparatus 83 are generally utilized together and are arranged in rows in a field, with long wires run or extend along each row of trellises 83 and attached thereto in the manner described above. The trellis structure 83 is particularly suitable for use in supporting "kiwi" fruit (chinese gooseberry) as well as grape vines in agricultural applications.

Referring next to FIG. 15 through FIG. 17, a third embodiment trellis apparatus 99 is shown, wherein like reference numerals denote like parts. In trellis apparatus 99, a fourth cross arm 100 is coupled to T-stake 76 via U-bolt 102 in the manner described above, with fourth cross arm 100 positioned below first cross arm 10 and generally parallel to first cross arm 10. Second and third cross arms 84, 86 are fastened to first and fourth cross arms 10, 100 adjacent the ends thereof as shown, in the manner described above and shown in FIG. 14. Trellis apparatus 99 provides a structure known as a "Geneva Double Curtain" or "GDC" trellis for use in vineyards. As with the trellis structures described above, a plurality of trellis apparatus 99 are generally used together in row arrangements, with long wires run or extend along each row of trellis apparatus 99 and attached to cross arm 10 via slotted catch holes 52, 54, and to cross arm 100 via slotted catch holes 104, 106, to accommodate vines or other crops entrained thereon.

Referring now to FIG. 18, a portion of an alternative embodiment cross arm apparatus 108 in accordance with the invention is shown, wherein like reference numbers denote like parts. Cross arm 108 includes a slot 110 in edge 18 adjacent end 14. Slot 110 accommodates a wire (not shown) which can be tied in place with a tie wire (also not shown) in a conventional manner using hole 66 to receive the tie wire. The cross arm 108 does not utilize slotted catch holes as described for cross arm 10. In all other respects the cross arm 108 is identical to cross arm 10 described above.

The cross arm apparatus 10 of the invention is easy and inexpensive to manufacture and use because hand labor associated with bendable parts is not required. The method of making and using the invention will be more fully understood by referring to FIG. 19, as well as FIG. 1 through FIG. 18. The order of the steps as outlined below is provided for clarity, and the particular order of steps disclosed herein should not be considered as limiting.

Generally, an elongated strip of sheet steel 112 is provided in a first step. The steel strip 112 preferably comes in the form of a roll or spool. In a second step, steel strip 112 is unrolled or removed from the roll and die-punched at regular intervals with "dumbell"-shaped holes 114. During the second step, additional holes and slots (not shown), which will ultimately correspond to oblong holes 38–42, notches 48, 50, T-slots 56–62, and round holes 46, 64, 66, are preferably die-punched into strip 112 as well.

In a third step, steel strip 112 is cut at intervals through line 116 through the dumbell shaped holes 114 to provide a plurality of strip segments (not shown), with each strip segment corresponding in length generally to the length of cross arm 10, and with each such segment including a slotted hole in each end. Thus, the cut along line 116 will ultimately define the ends 12, 14 on adjacent cross arms 10, with the slotted holes formed by cutting across dumbell-shaped hole 114 ultimately forming slotted holes 52, 54 on ends 12, 14 of adjacent cross arms 10. In a fourth step, the thusly cut segments of strip 112 are each roll-formed by conventional roll forming machinery to provide the cross arms 10 of the invention by roll forming folded section 24 adjacent first edge 16 and beveled or angled section 26 adjacent second edge 18, with planar section 28 therebetween, and with slotted catch holes 52, 54 positioned generally at the junction of folded section 24 and planar section 28 as described above. In a fifth step, one of the thusly formed cross arms 10 is fastened to a vertical support 76 in the manner described above to provide a trellis apparatus 75. In a subsequent step, second and third cross arms 84, 86 are fastened to first cross arm 10 and vertical support 76 to provide trellis apparatus 83. Alternatively, second, third and fourth cross arms may be provided, with fourth cross arm fastened to vertical support 76, and second and third cross arms 84, 86 fastened to first and fourth cross arms in the manner described above to provide trellis apparatus 99.

Additional trellis or support structures can be created by using the cross arm of the invention in the aforementioned manner, and various such structures will suggest themselves to those of ordinary skill in the art. While the cross arm of the invention is described generally in terms of use in agricultural trellises or support structures, it should be readily apparent that numerous additional uses for the cross arm of the invention are possible, including fencing, scaffolding, latticework and other structures.

Accordingly, it will be seen that this invention provides a cross arm apparatus for use in structural support for agricultural and other applications, which is suitable for use with mechanical harvesting equipment, which is easy and inexpensive to manufacture, and which is easy to install and use. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A cross arm apparatus, comprising:
   (a) a folded section including an inner part and an outer part;
   (b) a planar section, said planar section located adjacent said inner part of said folded section;
   (c) a first catch hole said first catch hole positioned at least partially on said planar section; and
   (d) a first slot said first slot communicating with said first catch hole, said first slot positioned on said inner part of said folded section.

2. A cross arm apparatus as recited in claim 1, further comprising means for coupling said cross arm to at least one support element.

3. A cross arm apparatus as recited in claim 1, further comprising first and second ends, said first slot communicating with said first end.

4. A cross arm apparatus as recited in claim 1, wherein said outer part of said folded section is substantially perpendicular to said planar section.

5. A cross arm apparatus as recited in claim 1, further comprising an angled section, said planar section located between said angled section and said folded section.

6. A cross arm apparatus as recited in claim 4, wherein said inner and outer parts of said folded section are substantially parallel to each other.

7. A cross arm apparatus as recited in claim 3, further comprising:
   (a) a second catch hole, said second catch hole positioned at least partially on said planar section; and
   (b) a second slot, said second slot communicating with said second catch hole and said second end, said second slot positioned on said inner part of said folded section.

8. A cross arm apparatus as recited in claim 2, wherein said means for coupling to a support element comprises first and second notches, said first notch included in said first edge, said second notch included in said second edge, said first and second notches laterally spaced apart from each other.

9. A cross arm apparatus, comprising:
   (a) a folded section, said folded section adjacent a first edge, said folded section extending between first and second ends, said folded section including an inner part and an outer part;
   (b) an angled section, said angled section adjacent a second edge, said angled section extending between said first and second ends;
   (c) a planar section, said planar section located between said angled section and said folded section, said planar section extending between said first and second ends, said planar section substantially perpendicular to said inner part of said folded section;

(d) a first catch hole, said first catch hole positioned at least partially on said planar section;

(e) a first slot, said first slot communicating with said first catch hole and said first end said first slot positioned on said inner part of said folded section;

(f) a second catch hole, said second catch hole positioned at least partially on said planar section, and (g) a second slot, said second slot communicating with said second catch hole and said second end, said second slot positioned on said inner part of said folded section.

10. A cross arm apparatus as recited in claim 9, further comprising means for releasibly attaching at least one wire to said cross arm.

11. A cross arm apparatus as recited in claim 9, further comprising means for coupling said cross arm to at least one support element.

12. A cross arm apparatus as recited in claim 9, wherein said inner part of said folded section is located adjacent said planar section, said outer part of said folded section is located adjacent said first edge, and said folded region comprises a curved region located between said inner and outer parts.

13. A cross arm apparatus as recited in claim 12, wherein said folded section is U-shaped, with said inner and outer parts of said folded section substantially parallel to each other, and with said inner and outer parts of said folded section substantially perpendicular to said planar section.

14. A cross arm apparatus as recited in claim 9, wherein said means for coupling to a support element comprises first and second notches, said first notch included in said first edge, said second notch included in said second edge, said first and second notches laterally spaced apart from each other.

15. A cross arm apparatus, comprising:

(a) a U-shaped folded section, said U-shaped folded section adjacent a first edge, said U-shaped folded section extending between first and second ends, said U-shaped folded section including an inner part, said U-shaped folded section including an outer part located adjacent said first edge, said U-shaped folded section including a curved region located between said inner and outer parts;

(b) an angled section, said angled section adjacent a second edge, said angled section extending between said first and second ends;

(c) a planar section, said planar section located between said angled section and said U-shaped folded section, said planar section extending between said first and second ends, said planar section located adjacent said inner part of said U-shaped folded section, said planar section substantially perpendicular to said inner and outer parts of said U-shaped folded section;

(d) a first catch hole, said first catch hole positioned at least partially on said planar section;

(e) a first slot, said first slot communicating with said first catch hole and said first end, said first slot positioned on said inner part of said folded section;

(f) a second catch hole, said second catch hole positioned at least partially on said planar section; and (g) a second slot, said second slot communicating with said second catch hole and said second end, said second slot positioned on said inner part of said folded section.

16. A cross arm apparatus as recited in claim 15, further comprising means for releasibly attaching at least one wire to said cross arm.

17. A cross arm apparatus as recited in claim 15, wherein said means for coupling to a support element comprises first and second notches, said first notch included in said first edge, said second notch included in said second edge, said first and second notches centrally positioned, said first and second notches laterally spaced apart from each other.

* * * * *